US012682061B2

(12) United States Patent
Fujii et al.

(10) Patent No.: US 12,682,061 B2
(45) Date of Patent: Jul. 14, 2026

(54) MALWARE ANALYSIS CONTINUATION SYSTEM AND MALWARE ANALYSIS CONTINUATION METHOD

(71) Applicant: Hitachi, Ltd., Tokyo (JP)

(72) Inventors: Shota Fujii, Tokyo (JP); Rei Yamagishi, Tokyo (JP); Katsuya Nishijima, Tokyo (JP); Tomohiro Shigemoto, Tokyo (JP); Takayuki Sato, Tokyo (JP)

(73) Assignee: Hitachi, Ltd, Tokyo (JP)

( * ) Notice: Subject to any disclaimer, the term of this patent is extended or adjusted under 35 U.S.C. 154(b) by 10 days.

(21) Appl. No.: 18/830,111

(22) Filed: Sep. 10, 2024

(65) Prior Publication Data

US 2025/0291919 A1 Sep. 18, 2025

(30) Foreign Application Priority Data

Mar. 15, 2024 (JP) ................................. 2024-041432

(51) Int. Cl.
G06F 21/56 (2013.01)
G06F 21/55 (2013.01)

(52) U.S. Cl.
CPC .......... G06F 21/566 (2013.01); G06F 21/554 (2013.01)

(58) Field of Classification Search
CPC .............................. G06F 21/566; G06F 21/554
See application file for complete search history.

(56) References Cited

U.S. PATENT DOCUMENTS

| | | | | |
|---|---|---|---|---|
| 9,032,204 | B2 * | 5/2015 | Byrd ..................... | H04L 9/3268 |
| | | | | 705/76 |
| 2009/0287653 | A1 * | 11/2009 | Bennett ................. | H04L 63/145 |
| 2013/0167235 | A1 * | 6/2013 | Kapoor .................. | G06F 21/56 |
| | | | | 726/24 |
| 2015/0082440 | A1 * | 3/2015 | Pickett ................. | H04L 63/145 |
| | | | | 726/24 |
| 2016/0099963 | A1 * | 4/2016 | Mahaffey .............. | H04L 63/166 |
| | | | | 726/25 |
| 2016/0127396 | A1 * | 5/2016 | Iwamura ............... | H04L 63/145 |
| | | | | 726/22 |
| 2018/0288076 | A1 * | 10/2018 | Onodera ............... | H04L 63/145 |
| 2020/0412703 | A1 * | 12/2020 | Kohli .................. | G06F 21/6245 |
| 2021/0126910 | A1 * | 4/2021 | Chauhan ............. | H04L 63/0428 |
| 2022/0030016 | A1 * | 1/2022 | Onodera .............. | G06F 21/566 |

(Continued)

FOREIGN PATENT DOCUMENTS

| | | |
|---|---|---|
| JP | 2018-169792 A | 11/2018 |
| JP | 2022-125123 A | 8/2022 |

OTHER PUBLICATIONS

Zhaoyan Xu, Antonio Nappa, Robert Baykov, Guangliang Yang, Juan Caballero, Guofei Gu: Autoprobe: Towards Automatic Active Malicious Server Probing Using Dynamic Binary Analysis, 21st ACM Conference on Computer and Communications Security (CCS'14), pp. 179 to 190 (2014).

(Continued)

*Primary Examiner* — Mohammed Waliullah
(74) *Attorney, Agent, or Firm* — Volpe Koenig

(57) ABSTRACT

Communication of dynamically analyzed malware is mediated. Even in a case where communication with the attacker server is stopped, a response accumulated as past data is returned to continue dynamic analysis.

12 Claims, 10 Drawing Sheets

(56)                    References Cited

U.S. PATENT DOCUMENTS

2023/0091318 A1*  3/2023  Lindemann ......... H04L 63/0861
                                                          726/4
2023/0141966 A1*  5/2023  Weeden ............... H04L 9/3247
                                                          713/185
2023/0196374 A1*  6/2023  Singh ................ G06Q 20/4016
                                                          705/44
2023/0224294 A1*  7/2023  Halemane .......... H04L 63/0884
                                                          726/7
2024/0291863 A1*  8/2024  Cohen ................ H04L 63/1425

OTHER PUBLICATIONS

Takahiro Shimakawa, Masahiro Kuyama, Makoto Sato, Toshio
Nawa, Hiroki Takakura, Ryoichi Sasaki: Development of intellec-
tual NEtwork forensic system LIFT against targeted attack—
Analysis of malware using dummy C&C Servers-, Multimedia,
Distributed, Cooperative, and Mobile (DICOMO2016) Symposium,
pp. 1087 to 1092 (2016).

* cited by examiner

F I G. 1
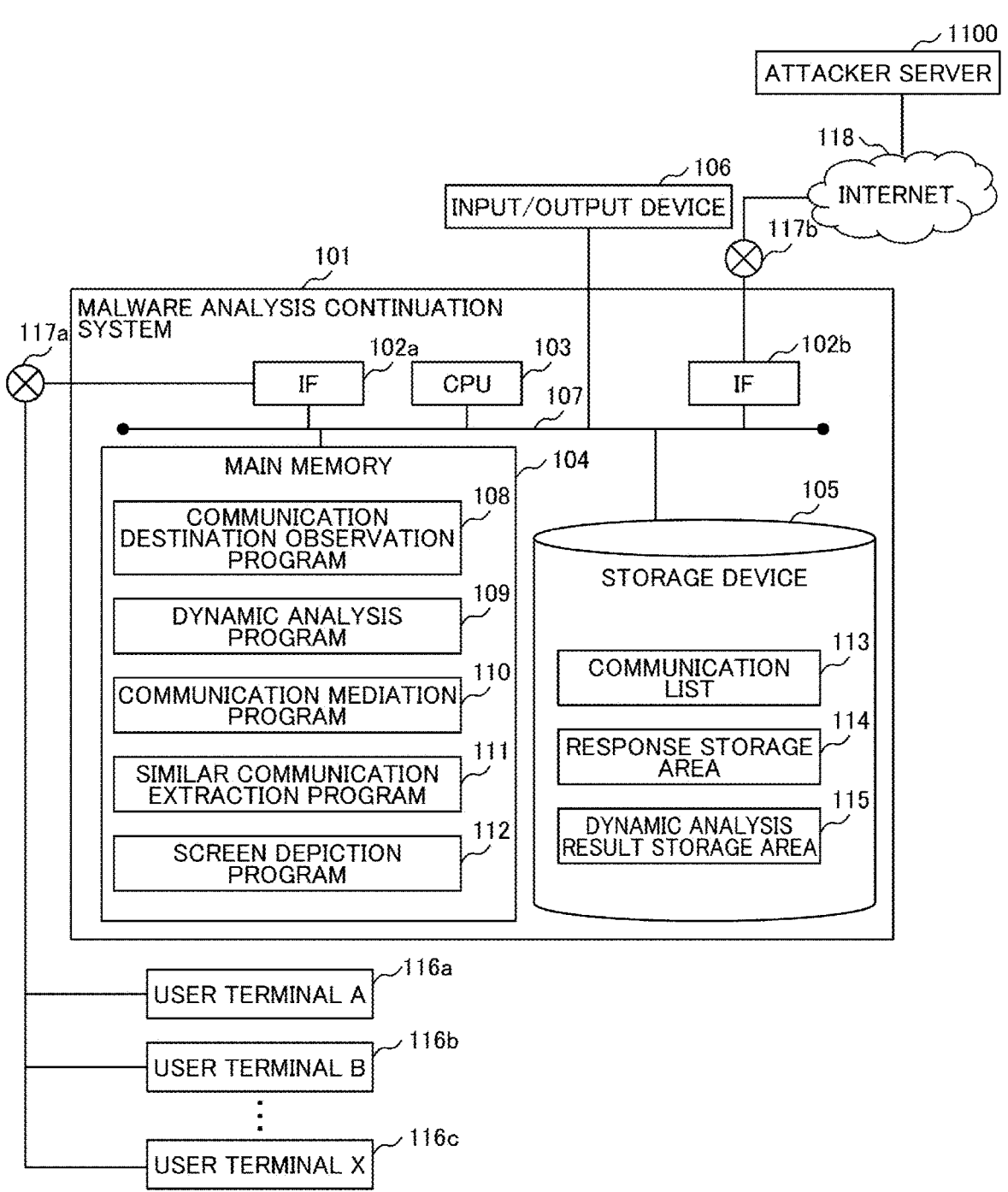

F I G. 2

| COMMUNICATION ID | REGISTRATION DATE AND TIME | URL | SAMPLE FAMILY NAME | REQUEST | RESPONSE |
|---|---|---|---|---|---|
| 201 | 202 | 203 | 204 | 205 | 206 |
| 0 | 2024-01-01 00:00:00 | example.com/hoge | familyA | GET /hoge HTTP/1.0 User-Agent: hoge .. | status: 200 date: Mon, 01 Jan 2024 .. |
| 1 | 2024-01-01 00:00:00 | example.com/fuga | familyA | GET /hoge HTTP/1.0 User-Agent: fuga .. | status: 200 date: Mon, 01 Jan 2024 .. |
| ... | ... | ... | ... | ... | ... |

F I G. 3
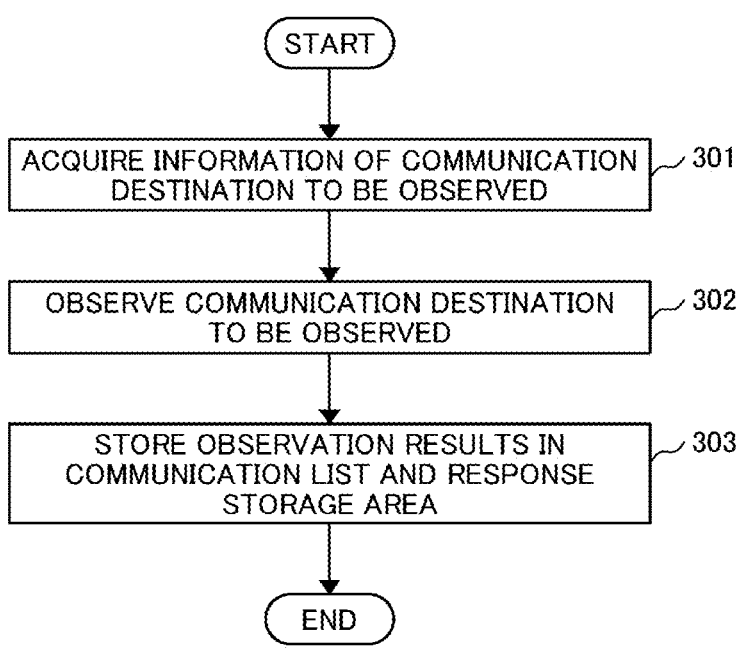

F I G .  4
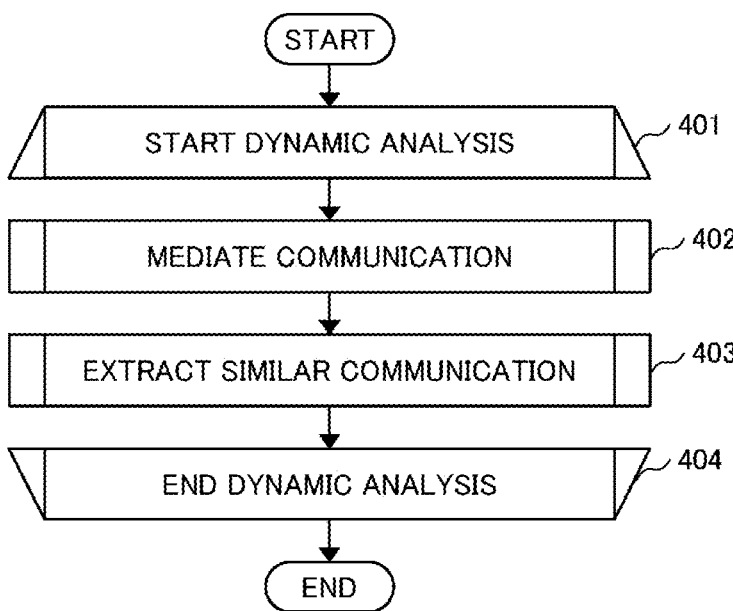
F I G .  5
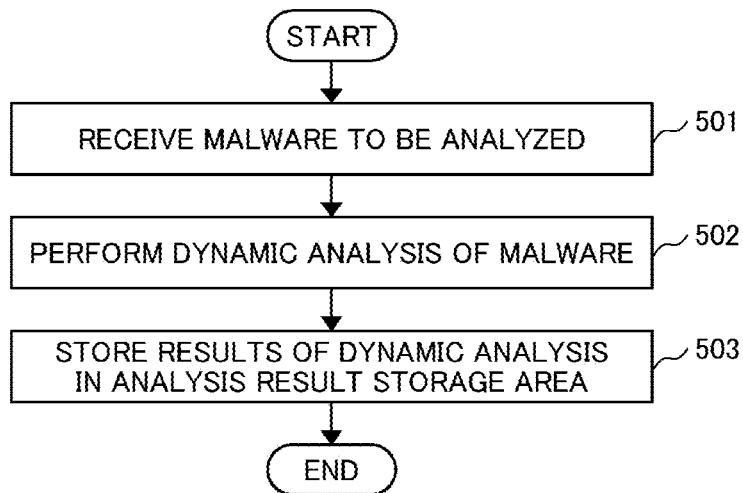

F I G. 6
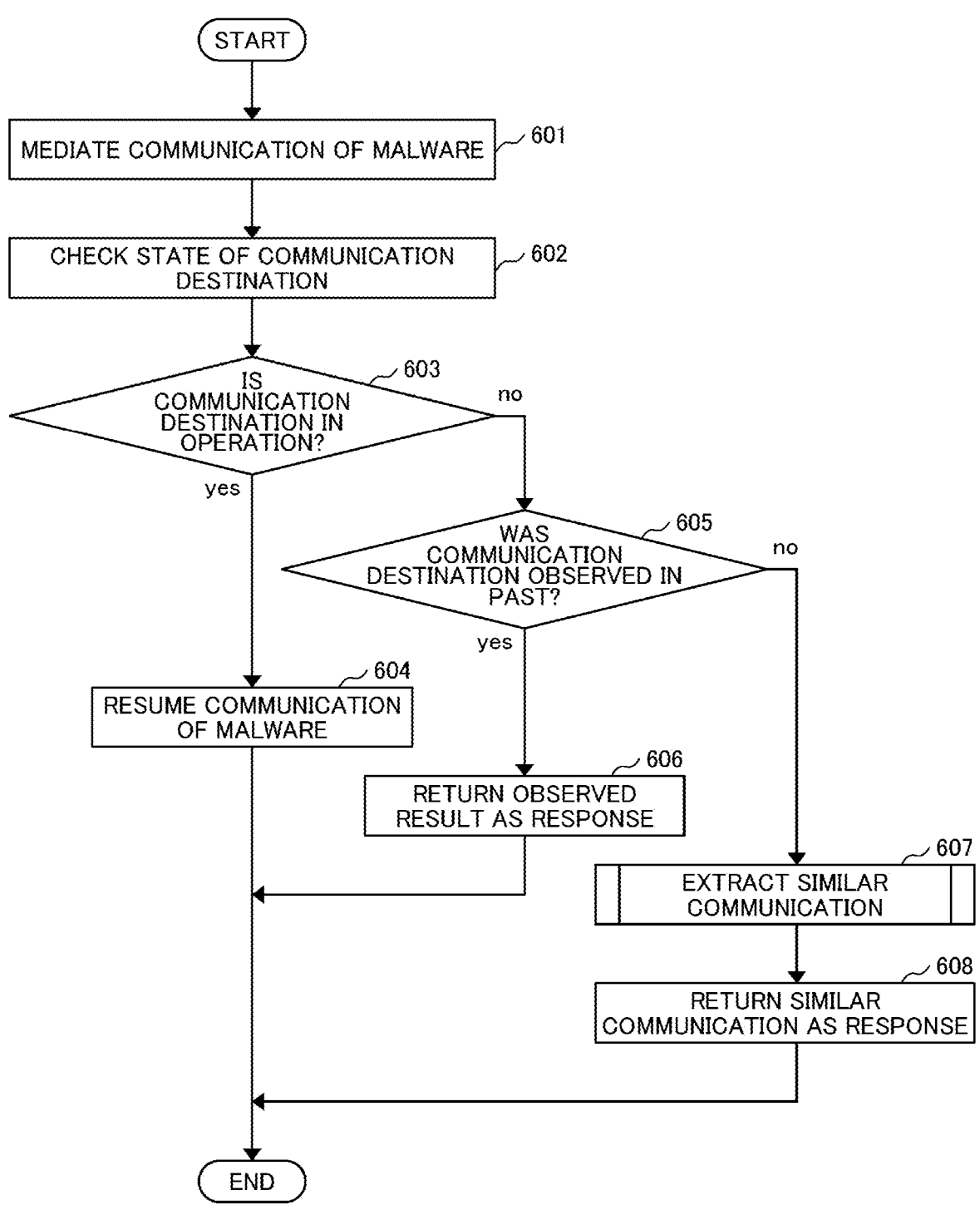

F I G. 7
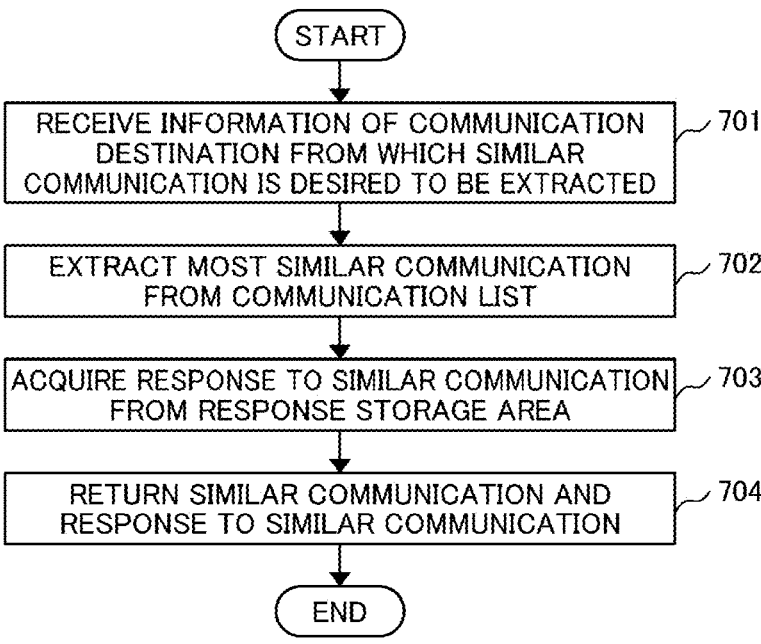
F I G. 8
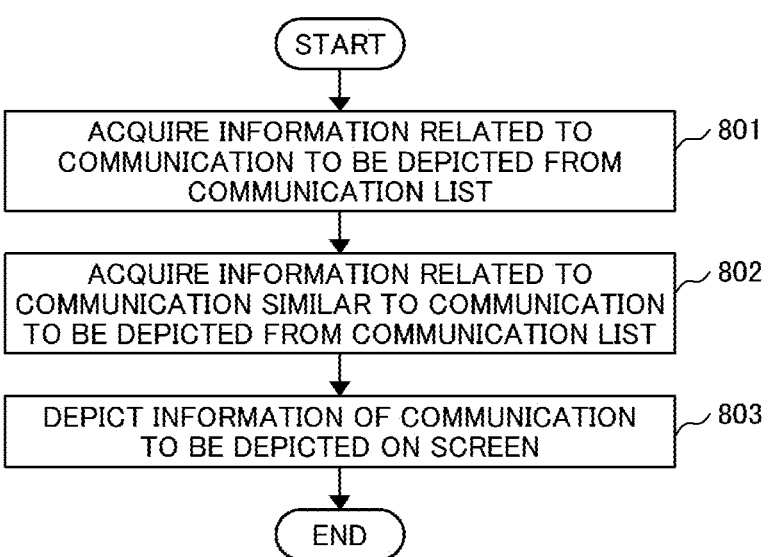

F I G. 9

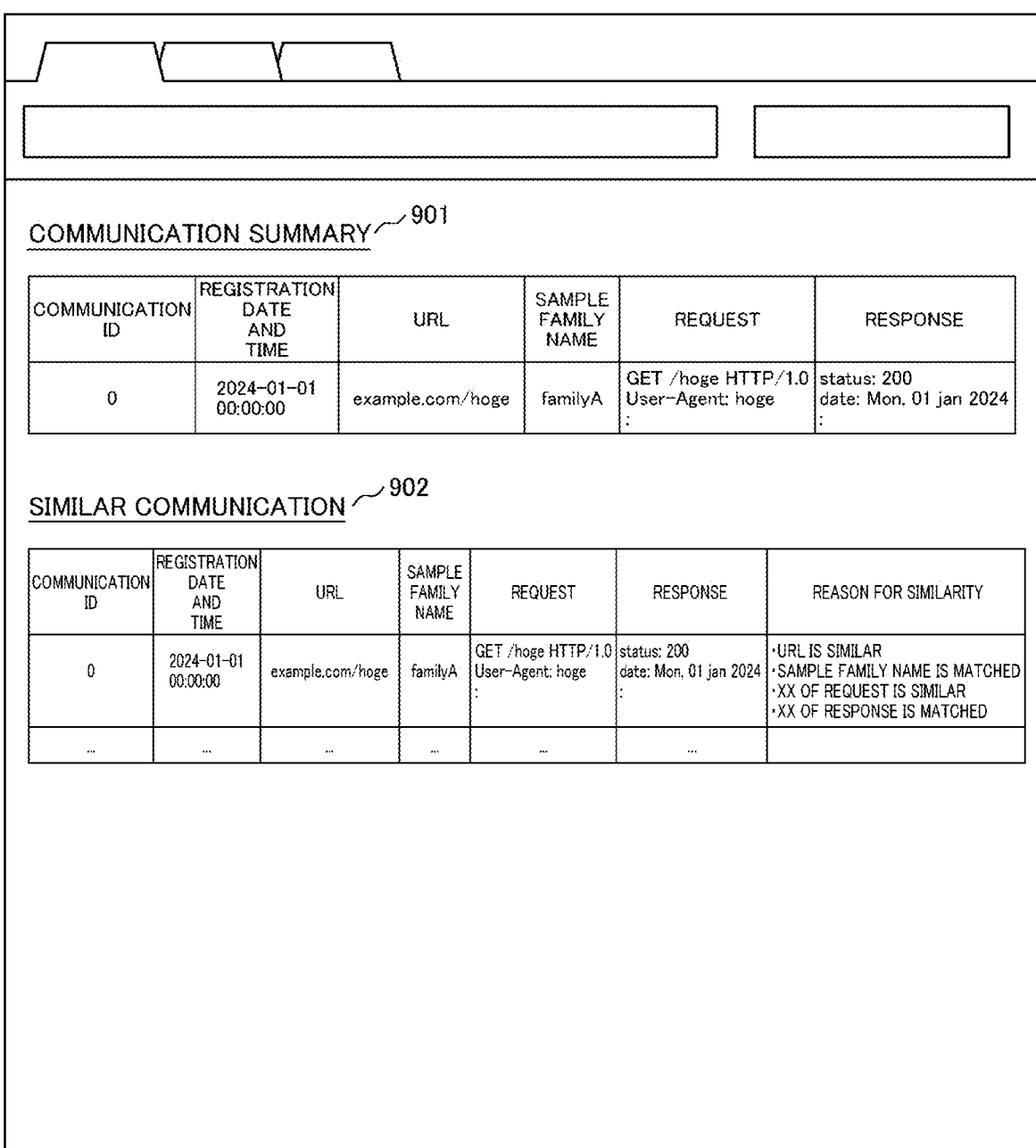

COMMUNICATION SUMMARY 901

| COMMUNICATION ID | REGISTRATION DATE AND TIME | URL | SAMPLE FAMILY NAME | REQUEST | RESPONSE |
|---|---|---|---|---|---|
| 0 | 2024-01-01 00:00:00 | example.com/hoge | familyA | GET /hoge HTTP/1.0 User-Agent: hoge : | status: 200 date: Mon, 01 jan 2024 : |

SIMILAR COMMUNICATION 902

| COMMUNICATION ID | REGISTRATION DATE AND TIME | URL | SAMPLE FAMILY NAME | REQUEST | RESPONSE | REASON FOR SIMILARITY |
|---|---|---|---|---|---|---|
| 0 | 2024-01-01 00:00:00 | example.com/hoge | familyA | GET /hoge HTTP/1.0 User-Agent: hoge : | status: 200 date: Mon, 01 jan 2024 : | ·URL IS SIMILAR ·SAMPLE FAMILY NAME IS MATCHED ·XX OF REQUEST IS SIMILAR ·XX OF RESPONSE IS MATCHED |
| ... | ... | ... | ... | ... | ... | |

Figure 1:
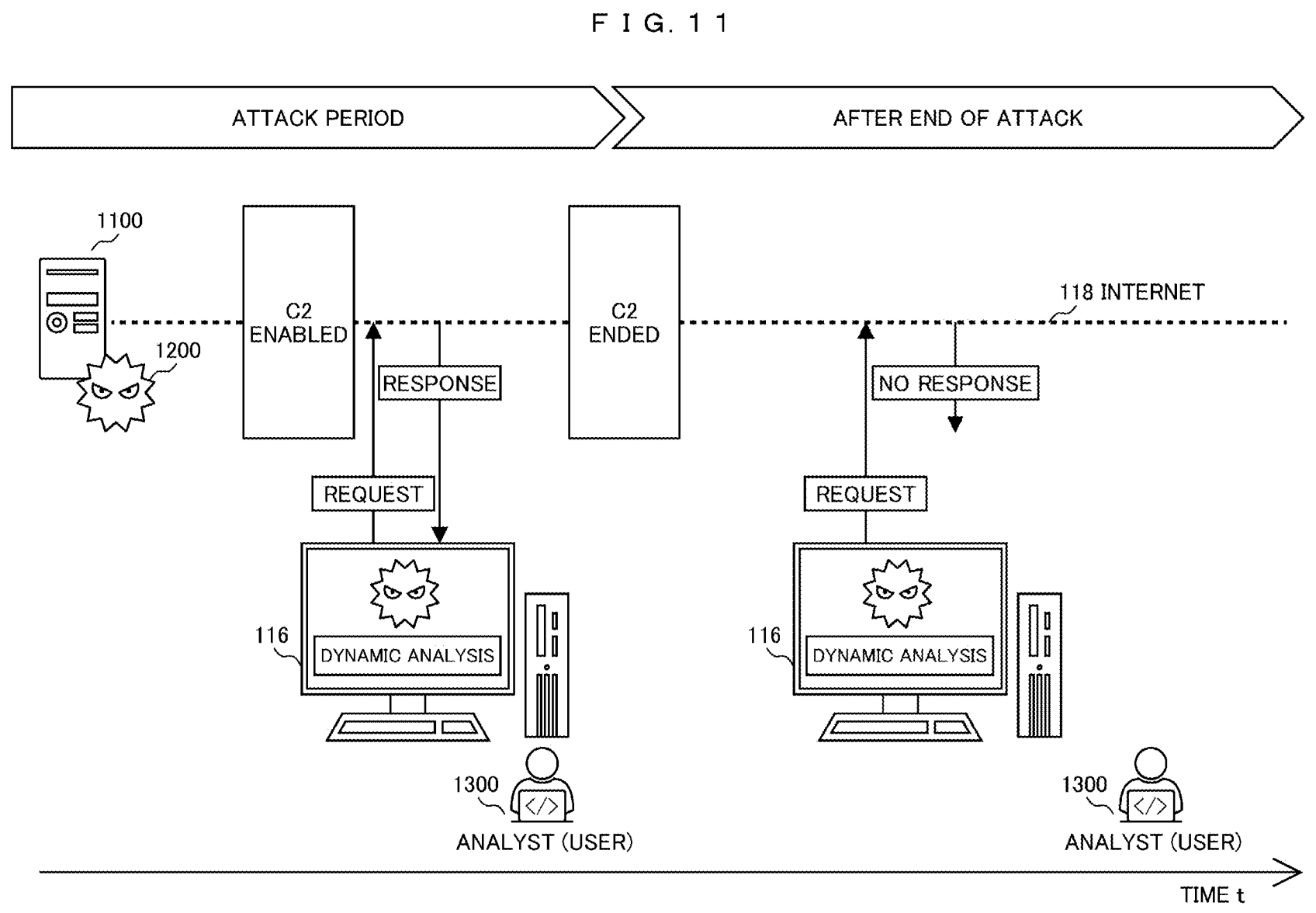

F I G. 1 1

ATTACK PERIOD

AFTER END OF ATTACK

118 INTERNET

C2 ENABLED

C2 ENDED

NO RESPONSE

RESPONSE

REQUEST

REQUEST

DYNAMIC ANALYSIS

DYNAMIC ANALYSIS

116

116

1300

1300

ANALYST (USER)

ANALYST (USER)

1100

1200

TIME t

F I G . 1 2

MALWARE ANALYSIS CONTINUATION SYSTEM AND MALWARE ANALYSIS CONTINUATION METHOD

BACKGROUND OF THE INVENTION

1. Field of the Invention

The present invention relates to a malware analysis continuation system and a malware analysis continuation method.

2. Description of the Related Art

There is dynamic analysis that actually runs malware, records a behavior of the malware, and performs analysis. This analysis method is widely used because it can be executed semi-automatically and can perform analysis efficiently. In addition, there is static analysis that deciphers codes of malware to manifest the behavior of the malware. However, this analysis method requires time and expertise. Therefore, the dynamic analysis tends to be more widely used.

On the other hand, in the dynamic analysis of the malware, the malware needs to actually run. Therefore, in a case where there are external dependencies, for example, the malware runs while communicating with an attacker server including a command & control (C2) server, when the condition is not satisfied, for example, when the attack has already been ended and the server of the attacker is no longer in operation, which makes it impossible to perform communication, as in this example, it is difficult to continue the analysis. Techniques related to this are disclosed in JP 2018-169792 A, JP 2022-125123 A, Zhaoyan Xu, Antonio Nappa, Robert Baykov, Guangliang Yang, Juan Caballero, Guofei Gu: AUTOPROBE: Towards Automatic Active Malicious Server Probing Using Dynamic Binary Analysis, 21st ACM Conference on Computer and Communications Security (CCS'14), pp. 179 to 190 (2014), and Takahiro Shimakawa, Masahiro Kuyama, Makoto Sato, Toshio Nawa, Hiroki Takakura, Ryoichi Sasaki: Development of intellectual network forensic system LIFT against targeted attack—Analysis of malware using dummy C&C Servers—, Multimedia, Distributed, Cooperative, and Mobile (DICOMO2016) Symposium, pp. 1087 to 1092 (2016).

In the dynamic analysis of malware, the malware needs to actually run. Therefore, in a case where there are external dependencies, for example, the malware runs while communicating with the attacker server, when the condition is not satisfied, for example, when the attack has already been ended and the server of the attacker is no longer in operation, which makes it impossible to perform communication, as in this example, it is difficult to continue the analysis.

In JP 2018-169792 A or JP 2022-125123 A, when communication by malware occurs, the communication is temporarily suspended, static analysis of the malware is performed, and then a response expected by the malware is made on the basis of the results of the static analysis to induce a process.

However, the static analysis of malware requires advanced skills and time. In addition, it is not easy to appropriately create communication expected by the malware on the basis of the results of the static analysis.

Zhaoyan Xu, Antonio Nappa, Robert Baykov, Guangliang Yang, Juan Caballero, Guofei Gu: AUTOPROBE: Towards Automatic Active Malicious Server Probing Using Dynamic Binary Analysis, 21st ACM Conference on Computer and Communications Security (CCS'14), pp. 179 to 190 (2014) discloses a technique that forcibly executes a process related to a response from C2 using symbolic execution, fuzzing, register rewriting, and the like and searches for an execution path depending on the response from C2.

However, the execution path is randomly detected due to the characteristics of the fuzzing and the like. Further, the object of this technique is not to continue dynamic analysis, but is to create a fingerprint of a C2 server.

Takahiro Shimakawa, Masahiro Kuyama, Makoto Sato, Toshio Nawa, Hiroki Takakura, Ryoichi Sasaki: Development of intellectual NEtwork forensic system LIFT against targeted attack—Analysis of malware using dummy C&C Servers—, Multimedia, Distributed, Cooperative, and Mobile (DICOMO2016) Symposium, pp. 1087 to 1092 (2016) discloses a technique that prepares a blockage analysis environment and an environment for C2 communication connected to the Internet, communicates with a destination detected in a blockage environment from the environment for C2 communication to acquire a file, and transmits the file to the blockage environment, thereby performing dynamic analysis of malware even in the blockage environment, that is, even in a state in which C2 is substantially not in operation.

However, this technology has restrictions, such as focusing only on files and the need for the C2 server to be alive at the time of analysis.

As described above, there are some techniques that attempt dynamic analysis even in a state in which the C2 server is not operating actually or in a pseudo manner. However, these techniques have problems, such as the need to perform static analysis separately and the need for the C2 server to be in operation.

SUMMARY OF THE INVENTION

An object of the present invention is to provide a malware analysis continuation system that continues analysis of malware even in a case where an attacker server is not in operation and it is difficult to perform communication.

According to an aspect of the present invention, there is provided a malware analysis continuation system connected to the Internet. The malware analysis continuation system includes: a communication destination observation unit observing communication with an attacker server and accumulating a response to the communication as past data; a dynamic analysis unit performing dynamic analysis of malware; a communication mediation unit mediating communication of the dynamically analyzed malware and performing control such that the response accumulated as the past data is returned to continue the dynamic analysis even in a case where the communication with the attacker server is stopped; a similar communication extraction unit extracting past communication similar to communication generated by the malware as similar communication from the past data; and a screen depiction unit depicting information related to the malware on a screen.

According to an aspect of the present invention, the malware analysis continuation system can continue analysis of malware even in a case where an attacker server is not in operation and it is difficult to perform communication.

BRIEF DESCRIPTION OF THE DRAWINGS

FIG. 1 is a diagram illustrating an example of a configuration of a malware analysis continuation system according to Embodiment 1 of the present invention;

FIG. 2 is a diagram illustrating an example of a communication list according to Embodiment 1 of the present invention;

FIG. 3 is a diagram illustrating a flow of a communication destination observation process according to Embodiment 1 of the present invention;

FIG. 4 is a diagram illustrating an overall processing flow according to Embodiment 1 of the present invention;

FIG. 5 is a diagram illustrating a flow of a dynamic analysis process according to Embodiment 1 of the present invention;

FIG. 6 is a diagram illustrating a flow of a communication mediation process according to Embodiment 1 of the present invention;

FIG. 7 is a diagram illustrating a flow of a similar communication extraction process according to Embodiment 1 of the present invention;

FIG. 8 is a diagram illustrating a flow of a screen depiction process according to Embodiment 1 of the present invention;

FIG. 9 is a diagram illustrating an example of a malware analysis continuation system depiction screen according to Embodiment 1 of the present invention;

FIG. 11 is a system diagram illustrating problems of the malware analysis continuation system; and FIG. 12 is a system diagram that solves the problems of the malware analysis continuation system.

DETAILED DESCRIPTION OF THE PREFERRED EMBODIMENTS

Figure 10:
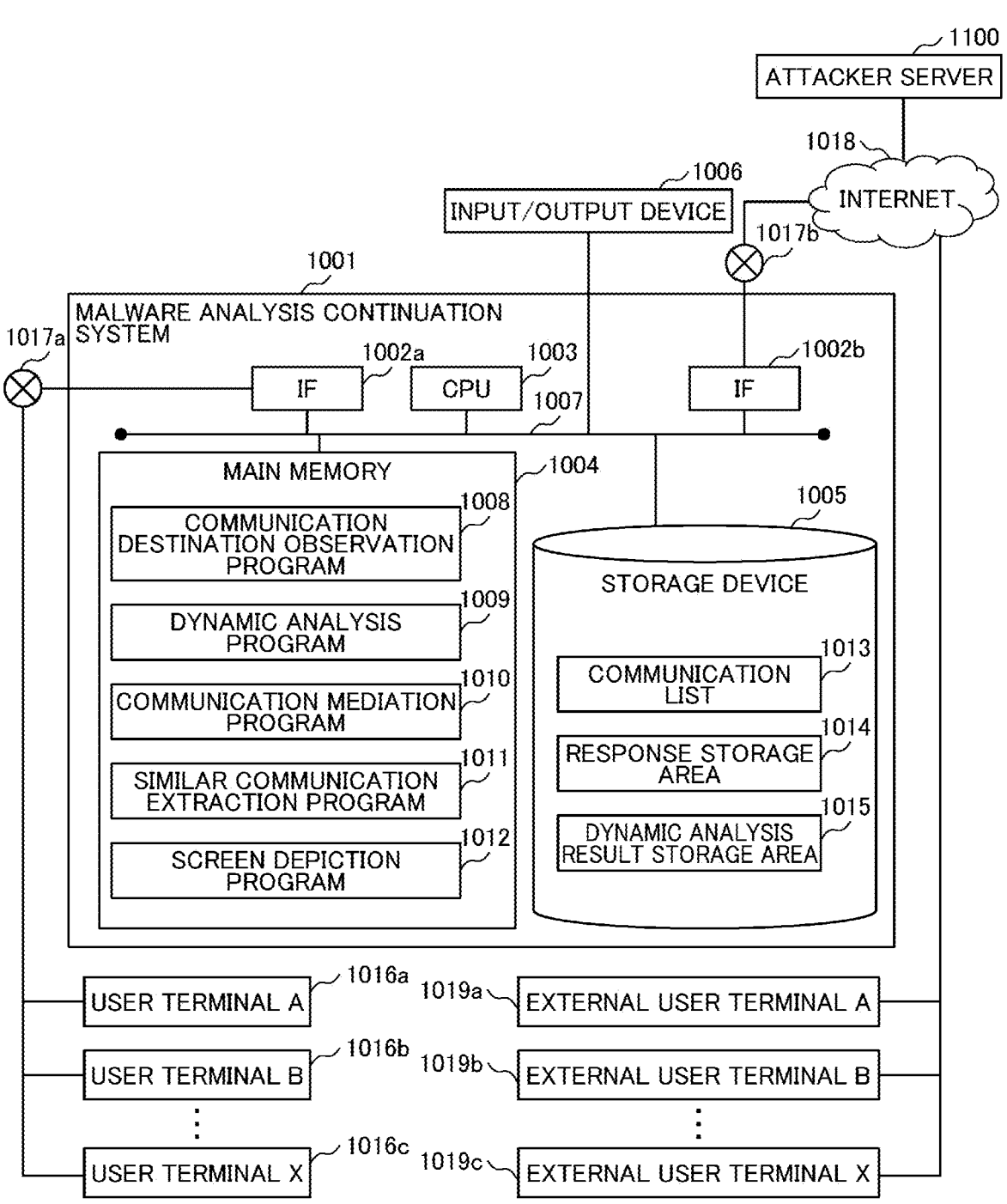
FIG. 10 is a diagram illustrating an example of a configuration of a malware analysis continuation system according to Embodiment 2 of the present invention.

Hereinafter, embodiments of the present invention will be described with reference to the drawings. However, the present invention is not interpreted as being limited to the content of the embodiments described below. It will be easily understood by those skilled in the art that a specific configuration of the present invention can be modified without departing from the concept or gist of the present invention.

In the configurations of the invention that will be described below, the same or similar configurations or functions are denoted by the same reference numerals, and a duplicated description thereof will be omitted.

In this specification, the terms "first", "second", "third", and the like are used to identify components and do not necessarily limit the number or order of components.

In some cases, the position, size, shape, range, and the like of each configuration illustrated in the drawings and the like do not indicate the actual position, size, shape, range, and the like in order to facilitate understanding of the invention. Therefore, the present invention is not limited to the position, size, shape, range, and the like disclosed in the drawings and the like.

Embodiment 1

Embodiment 1 shows a process of a malware analysis continuation system by attack communication substitution in a case where a result of separate observation is returned as a substitute for attack communication, such as command control (C2) communication, to a malware sample to continue or manifest the original operation, thereby automatically continuing and inducing a behavior of malware.

Figure 1:
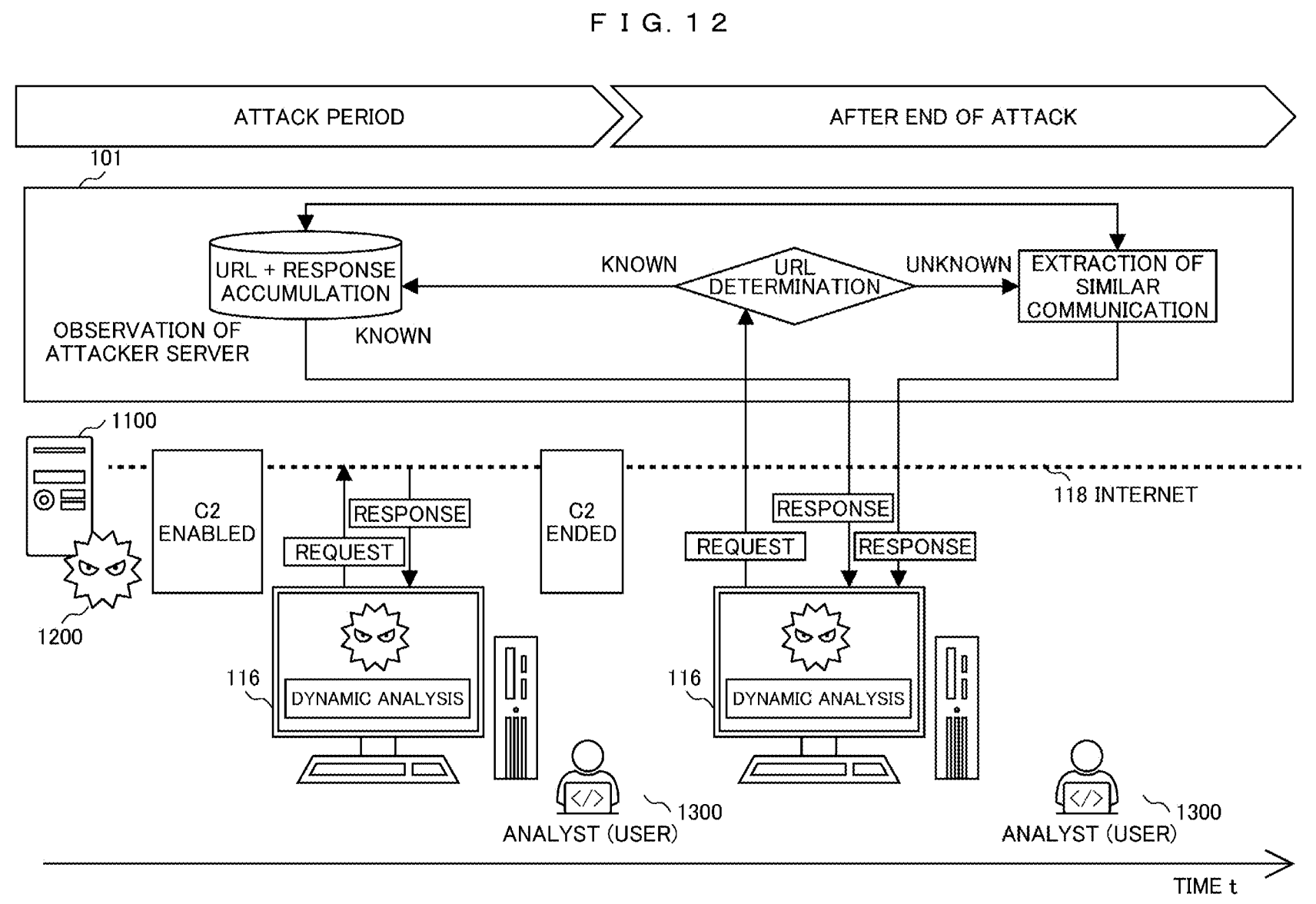

FIG. 1 is a diagram illustrating an example of a configuration of a malware analysis continuation system by attack communication substitution according to an embodiment of the present invention. A malware analysis continuation system 101 by attack communication substitution according to the embodiment connects a user terminal 116 operated by a user and the Internet 118 via a network 117. An attacker server 1100 is connected to the Internet 118.

The malware analysis continuation system 101 by attack communication substitution is a computer including a central processing unit (CPU) 103, a main memory 104 for storing data necessary for the CPU 103 to execute processes, a storage device 105, such as a hard disk or a flash memory, having the capacity to store a large amount of data, an interface (IF) 102 for communicating with other devices, an input/output device 106, such as a keyboard or a display, for inputting and outputting data, and a communication path 107 connecting these devices. In addition, the communication path 107 is, for example, an information transmission medium such as a bus or a cable.

The CPU 103 executes a communication destination observation program 108 stored in the main memory 104 to configure a communication destination observation unit and observes the attacker server. Further, the CPU 103 executes a dynamic analysis program 109 stored in the main memory 104 to configure a dynamic analysis unit and performs dynamic analysis of the malware to be analyzed.

Furthermore, the CPU 103 executes a communication mediation program 110 stored in the main memory 104 to configure a communication mediation unit and mediates communication occurring during the dynamic analysis. Moreover, the CPU 103 executes a similar communication extraction program 111 stored in the main memory 104 to configure a similar communication extraction unit and extracts communication similar to the target communication from a communication list 113.

In addition, the CPU 103 executes a screen depiction program 112 stored in the main memory 104 to configure a screen depiction unit and presents various results through a screen.

The storage device 105 stores the communication list 113 that manages information of communication destinations, a response storage area 114 that stores responses acquired from the communication destinations, and a dynamic analysis result storage area list 115 that stores the results of the dynamic analysis of the malware.

Each of the above-described programs and data may be stored in advance in the memory 104 or the storage device 105 or may be installed (loaded) from the input/output device 106 or from other devices via the IF 102 when needed.

Further, the configuration of the malware analysis continuation system by attack communication substitution described with reference to FIG. 1 is only an example, and the present invention is not limited thereto.

FIG. 2 is a diagram illustrating an example of the communication list 113. The communication list 113 is past data created by the communication destination observation program (communication destination observation unit) 108.

As illustrated in FIG. 2, the communication list 113 is configured to include, for example, a communication ID 201, a registration date and time 202, a URL 203, a sample family name 204, a request 205, and a response 206 (stored in the response storage area 114 illustrated in FIG. 1).

The communication ID 201 is a field that stores for uniquely identifying the identification information communication destination to be observed. In Embodiment 1, a number is stored as the identification information in the communication ID 201.

The registration date and time 202 indicates the date and time when the communication destination was registered in the system. For example, a communication destination corresponding to an entry with a communication ID 201 of "0" was registered at 00:00:00 on Jan. 1, 2024. The present invention is not limited to the data format of the time stored in the registration date and time 202. Any data format, such as Unixtime, may be used as long as the data format can determine the time.

The URL 203 is a field that stores the URL of the communication destination to be observed. For example, the URL name of the communication destination corresponding to the entry with the communication ID 201 of "0" is "example.com.hoge".

The sample family name 204 is a field that stores the family name of the malware associated with the communication destination to be observed. For example, the family name of the malware associated with the communication destination corresponding to the entry with the communication ID 201 of "0" is "family A".

The request 205 is a field that stores the content of a request when the communication destination to be observed is observed. For example, a request when the communication destination corresponding to the entry with the communication ID 201 of "0" is observed is composed of "GET/hoge HTTP/1.0", "User-Agent: hoge", or the like.

The response 206 is a field that stores the content of a response obtained from the communication destination to be observed. For example, a response obtained when the communication destination corresponding to the entry with the communication ID 201 of "0" is observed is composed of "status: 200", "date: Mon, 1 Jan. 2024", or the like.

In addition, the communication list described with reference to FIG. 2 is only an example, and the present invention is not limited thereto.

Next, a process executed by the malware analysis continuation system 101 will be described.

The malware analysis continuation system 101 by attack communication substitution observes the communication destination of an attacker and accumulates observation results, separately from a malware dynamic analysis process centered on the dynamic analysis program 109.

FIG. 3 is a flowchart illustrating an example of a communication destination observation process executed by the malware analysis continuation system 101 according to Embodiment 1.

When receiving an execution instruction, the communication destination observation program 108 executed by the CPU 103 starts the process described below.

The communication destination observation program (communication destination observation unit) 108 acquires information of the communication destination to be observed (Step 301). For example, the information is acquired from a security vendor's website or a commercial service that shares information of the communication destination exploited by the attacker.

Then, the communication destination observation program 108 observes the communication destination to be observed which has been acquired in Step 301 (Step 302).

Then, the communication destination observation program 108 stores the observation results of the communication destination obtained in Step 302 in the communication list 113 and the response storage area 114 and ends the process (Step 303).

In addition, a method for observing the communication destination described with reference to FIG. 3 is only an example, and the present invention is not limited thereto.

For example, there is a case where not only attack communication but also non-attack communication is returned to the same communication destination, according to the time or the access source. Therefore, for example, an advanced technique may be contrived that determines whether or not the communication is attack communication on the basis of the content of the communication and accumulates only the communication that seems to be attack communication.

In addition, various types of observation systems may be prepared to observe the communication destination in order to obtain attack communication. For example, an advanced technique may be contrived that prepares a plurality of types of guardware, such as virtual machines, physical machines, and clouds, as guardware, prepares a plurality of operating systems (OSs), browsers, and the like as software, selects communication that seems to be attack communication from a plurality of types of communication, and stores the selected communication.

FIG. 4 is a flowchart illustrating an outline of a main process executed by the malware analysis continuation system 101 according to Embodiment 1.

First, the malware analysis continuation system 101 performs dynamic analysis (Step 401). Details thereof will be described with reference to FIG. 5.

Then, in a case where communication occurs during the dynamic analysis, the communication is mediated (Step 402). Details thereof will be described with reference to FIG. 6.

Then, for the mediated communication, similar communication is extracted from the communication list 113 (Step 403). Details thereof will be described with reference to FIG. 7.

The processes in Steps 402 and 403 are executed until the dynamic analysis is ended. When the dynamic analysis is ended, the entire flow of the process is also ended (Step 404).

In addition, the processing flow of the malware analysis continuation system described with reference to FIG. 4 is only an example, and the present invention is not limited thereto.

FIG. 5 is a flowchart illustrating an example of a dynamic analysis process executed by the malware analysis continuation system 101 according to Embodiment 1.

When receiving an execution instruction, the dynamic analysis program (dynamic analysis unit) 109 executed by the CPU 103 starts the process described below.

The dynamic analysis program 109 receives malware to be analyzed from a user (Step 501).

Then, the dynamic analysis program 109 performs dynamic analysis of the malware received in Step 501 (Step 502). For example, the dynamic analysis program 109 actually runs the malware for a predetermined period of time to obtain information of the connection destination, running process, generated files, and the like of the malware.

Then, the dynamic analysis program 109 stores the results of the dynamic analysis of the malware obtained in Step 502 in the analysis result storage area 115 and ends the process (Step 503).

Further, the dynamic analysis processing method described with reference to FIG. 5 is only an example, and the present invention is not limited thereto. In addition, the results of the dynamic analysis of the malware may be acquired from a source other than the dynamic analysis program 109 and recorded. For example, the results of the dynamic analysis may be acquired from an external malware analysis continuation system or malware analysis service.

FIG. 6 is a flowchart illustrating an example of a communication mediation process executed by the malware analysis continuation system 101 according to Embodiment 1.

When receiving an execution instruction, the communication mediation program 110 (communication mediation unit) executed by the CPU 103 starts the process described below.

The communication mediation program 110 is triggered by the occurrence of communication during the dynamic analysis and mediates the communication of the malware (Step 601).

Then, the communication mediation program 110 checks the state of the communication destination of the communication that has been mediated in Step 601 and temporarily suspended (Step 602). Specifically, the communication mediation program 110 checks an operating state of the communication destination.

Then, the communication mediation program 110 checks whether or not the communication destination is in operation (Step 603). In a case where the communication destination is in operation, the process proceeds to Step 604. In a case where the communication destination is not in operation, the process proceeds to Step 605.

The communication mediation program 110 resumes the communication that has been mediated in Step 601 and temporarily suspended and ends the process (Step 604).

The communication mediation program 110 checks whether or not the communication destination was observed in the past with reference to the communication list 113 (Step 605). In a case where the communication destination was observed, the process proceeds to Step 606. In a case where the communication destination was not observed, the process proceeds to Step 607.

The communication mediation program 110 returns, as a response, the results of the observation for the communication that has been mediated in Step 601 and temporarily suspended and ends the process (Step 606).

The communication mediation program 110 extracts communication similar to the communication (Step 607). Details thereof will be described with reference to FIG. 7.

The communication mediation program 110 returns, as a response, the result of the communication extracted in Step 607 for the communication that has been mediated in Step 601 and temporarily suspended and ends the process (Step 608).

In addition, the communication mediation processing method described with reference to FIG. 6 is only an example, and the present invention is not limited thereto.

For example, as described above, there is a case where not only attack communication but also non-attack communication is returned to the same communication destination, according to the time or the access source. Therefore, for example, an advanced technique may be contrived that, in a case where a response that does not seem to be attack communication is returned from the communication destination even though the communication destination is in operation, returns the accumulated attack communication instead of the response.

Further, alternative responses or simulations may be made not only for the content of the communication but also for other matters. For example, for DNMS, a past DNS in which the communication destination was in operation may be simulated to perform name resolution. Alternatively, name resolution may be performed for a specific environment such as an organization to be attacked.

Furthermore, there is malware that determines that, in a case where the response time is short, communication is not actually performed, but is performed locally and stops the operation. Therefore, the time actually required for communication may be simulated.

FIG. 7 is a flowchart illustrating an example of a similar communication extraction process executed by the malware analysis continuation system 101 according to Embodiment 1.

When receiving an execution instruction, the similar communication extraction program 111 (similar communication extraction unit) executed by the CPU 103 starts the process described below.

The similar communication extraction program 111 receives information of the communication destination, from which similar communication is desired to be extracted, from the communication mediation program 110 (Step 701).

Then, the similar communication extraction program 111 extracts communication that is most similar to the communication destination received in Step 701 from the communication list 113 (Step 702). For example, the similar communication extraction program 111 extracts the similar communication using the similarities s of a sample family, a URL path, communication parameters, and the like.

Then, the similar communication extraction program 111 acquires a response to the similar communication extracted in Step 702 from the response storage area 114 (Step 703).

Then, the similar communication extraction program 111 returns the similar communication acquired in Step 702 and the response to the communication acquired in Step 703 and ends the process (Step 704).

In addition, the similar communication extraction processing method described with reference to FIG. 7 is only an example, and the present invention is not limited thereto.

The malware analysis continuation system 101 executes a screen depiction process for displaying various types of information to the user, separately from the process described with reference to FIG. 4.

FIG. 8 is a flowchart illustrating an example of a screen depiction process executed by malware analysis continuation system 101 according to Embodiment 1.

When receiving an execution instruction, the screen depiction program (screen depiction unit) 112 executed by the CPU 103 starts the process described below.

The screen depiction program 112 acquires information related to the communication to be depicted from the communication list 113 (Step 801). Here, it is assumed that a list including an entry composed of the communication ID 201 is acquired.

The screen depiction program 112 acquires information related to communication similar to the communication to be depicted from the communication list 113 (Step 802). Here, it is assumed that a list including an entry composed of the communication ID 201 is acquired.

The screen depiction program 112 depicts information related to the malware to be depicted on the screen (Step 803) and ends the process.

In addition, the screen depiction method described with reference to FIG. 8 is only an example, and the present invention is not limited thereto.

FIG. 9 is an example of a malware analysis continuation system depiction screen generated by a program constituting the malware analysis continuation system 101 according to Embodiment 1.

The screen illustrated in FIG. 9 includes a communication summary 901 and similar communication 902.

The communication summary (malicious website summary) 901 is basic information related to the communication to be depicted. For example, the communication summary includes a communication ID, a registration date and time, a URL, a sample family name, a request, and a response.

The similar communication 902 is a list of communications similar to the communication to be depicted. For example, the similar communication 902 includes a communication ID, a registration date and time, a URL, a sample family name, a request, a response, and a reason for similarity. Here, the reason for similarity may be, for example, that the URL is similar, that the sample family name is matched, that a portion of the request is similar, and that a portion of the response is matched.

As described above, the communication is displayed with a focus on the predicted lifetime of the communication. Therefore, the effect of supporting the creation of a watch list or a block list by the users including analysts is expected.

In addition, here, the depiction screen based on the execution results of each program according to Embodiment 1 is given as an example. However, this is only an example, and the present invention is not limited thereto. For example, any information related to the communication destination may be depicted in any format.

The dynamic analysis of malware is important in security work, but has the following problem. The malware needs to actually run. Therefore, in a case where there are external dependencies, for example, the malware runs while communicating with an attacker server including a C2 server, when the condition is not satisfied, it is difficult to continue the analysis.

According to Embodiment 1, the malware analysis continuation system, 101 by attack communication substitution returns the result of separate observation as a substitute for attack communication, such as C2 communication, to the malware sample to continue or manifest the original operation, thereby automatically continuing and inducing the behavior of the malware.

Therefore, it is expected that the dynamic analysis of malware can be performed even in a situation in which it is difficult to continue the dynamic analysis of malware as in the related art, for example, even in a case where the communication destination is not in operation.

In addition, in Embodiment 1, the method of passively returning communication in response to the request from the malware sample has been described. However, Embodiment 1 is not limited thereto. For example, an advanced technique may be contrived that actively sends, to the malware sample, a response to communication similar to the request issued by the malware sample to actively induce the behavior of the malware sample.

Embodiment 2

Embodiment 2 shows a process of a malware analysis continuation system that enables the use of a support function from the outside via the network in addition to the support of on-premise malware dynamic analysis such that services can be provided via the cloud.

Hereinafter, Embodiment 2 will be described with a focus on the differences from Embodiment 1.

FIG. 10 is a diagram illustrating an example of a configuration of a malware analysis continuation system 1001 according to Embodiment 2 of the present invention. Since the configuration of the malware analysis continuation system according to Embodiment 2 is the same as that according to Embodiment 1, a description thereof will be omitted.

A hardware configuration of the malware analysis continuation system according to Embodiment 2 differs from the hardware configuration according to Embodiment 1 in that it includes an external user terminal 1019. In Embodiment 2, each program executes processes in response to a request from not only a user terminal 1016 within the network but also the external user terminal 1019 and returns the results of the processes to the external user terminal 1019 via the Internet 1018. This makes it possible to provide services via the cloud.

Programs according to Embodiment 2 are the same as those according to Embodiment 1. In addition, processes executed by a communication destination observation program 1008, a dynamic analysis program 1009, a communication mediation program 1010, a similar communication extraction program 1011, and a screen depiction program 1012 according to Embodiment 2 are the same as those according to Embodiment 1. A data structure according to Embodiment 2 is the same as that according to Embodiment 1.

In addition, the configuration of the malware analysis continuation system according to Embodiment 2 described with reference to FIG. 10 is only an example, and the present invention is not limited thereto.

According to Embodiment 2, the malware analysis continuation system 1001 provides an on-premise malware analysis support function to the internal user as in Embodiment 1 and also provides the same information to the external user via the Internet 1018. This makes it possible to provide services via the cloud.

Finally, the problems of the malware analysis continuation system and a configuration for solving the problems will be described with reference to FIGS. 11 and 12.

FIG. 11 is a system diagram illustrating the problems of the malware analysis continuation system.

As illustrated in FIG. 11, an attacker server (C2 server) 1110 performs, for example, the transmission of an attack command and the sending of additional files through malware 1200. During an attack period (C2 enabled) for which the attacker server 1110 is in operation, a user 1300, who is an analyst, performs dynamic analysis using the user terminal 116. Specifically, a request is sent from the malware, and a response is sent from the attacker server 1110. As described above, during the attack period (C2 enabled), it is possible to manifest the operation while communicating with the attacker server 1110 and to perform dynamic analysis.

However, when a certain amount of time has passed since the start of the attack, the attacker destroys the attacker server 1110 (C2 ended). After an attack end period (C2 ended) for which the attacker server 1110 is not in operation and is stopped, the request sent from the malware does not reach the attacker server 1110, and no response is sent from the attacker server 1110. As a result, the user 1300, who is the analyst, is not able to perform dynamic analysis using the user terminal 116. As described above, since the attacker server 1110 is stopped, there is no response, and the operation after communication is not manifested. As a result, it is not possible to perform dynamic analysis.

FIG. 12 is a diagram illustrating the malware analysis continuation system according to the present invention that has solved the above-mentioned problems.

As illustrated in FIG. 12, during the attack period (C2 enabled) for which the attacker server 1110 is in operation, the user 1300, who is an analyst, performs dynamic analysis using the user terminal 116. Specifically, a request is sent from the malware, and a response is sent from the attacker server 1110. As described above, during the attack period (C2 enabled), it is possible to manifest the operation while communicating with the attacker server 1110 and to perform dynamic analysis.

However, when a certain amount of time has passed since the start of the attack, the attacker destroys the attacker server 1110 (C2 ended). After an attack end period (C2 termination) for which the attacker server 1110 is not in operation and is stopped, the request sent from the malware does not reach the attacker server 1110, and no response is sent from the attacker server 1110. As a result, the user 1300, who is the analyst, is not able to perform dynamic analysis using the user terminal 116.

Therefore, in the present invention, the request sent from the malware is transmitted to the malware analysis continuation system 101 illustrated in FIG. 1. The malware analysis continuation system 101 determines the URL. In a case where the URL is known, the malware analysis continuation system 101 returns the accumulated response to the malware. In addition, the malware analysis continuation system 101 determines the URL. In a case where the URL is unknown, the malware analysis continuation system 101 extracts similar communication and returns the similar communication as a response to the malware.

As described above, in the present invention, the result of separate observation is returned as a substitute for attack communication, such as C2 communication, to the malware to continue or manifest the original operation.

According to the above-described embodiment, the result of separate observation is returned as a substitute for attack communication, such as C2 communication, to the malware sample to continue or manifest the original operation. This makes it possible to support the dynamic analysis of malware by automatically continuing and inducing the behavior of the malware.

What is claimed is:

1. A malware analysis continuation system connected to an Internet, comprising:
   a processor;
   a memory storing programs;
   wherein the processor executes the programs to configure:
   a communication destination observation unit configured to observe communication with an attacker server and accumulating a response to the communication as past data;
   a dynamic analysis unit configured to perform dynamic analysis of malware;
   a communication mediation unit configured to mediate communication of the dynamically analyzed malware and performing control such that the response accumulated as the past data is returned to continue the dynamic analysis even in a case where the communication with the attacker server is stopped;
   a similar communication extraction unit configured to extract past communication similar to communication generated by the malware as similar communication from the past data; and
   a screen depiction unit configured to depict information related to the malware on a screen,
   wherein the screen depiction unit displays a communication summary of the communication and content of the similar communication as the information related to the malware on the screen, and the communication summary and the similar communication include a URL of the attacker server, a sample family name of the malware, a request issued by the malware, and a response from the attacker server.

2. The malware analysis continuation system according to claim 1,
   wherein the communication mediation unit temporarily suspends the communication with the attacker server, checks a state of a communication destination of the communication, determines whether or not the communication destination is in operation, and resumes the communication of the malware when determining that the communication destination is in operation.

3. The malware analysis continuation system according to claim 2,
   wherein the communication mediation unit determines whether or not the communication destination was observed in the past when determining that the communication destination is not in operation and returns the observed result as the response for the temporarily suspended communication when determining that the communication destination was observed in the past.

4. The malware analysis continuation system according to claim 3,
   wherein the communication mediation unit returns the similar communication as the response for the temporarily suspended communication when determining that the communication destination was not observed in the past.

5. The malware analysis continuation system according to claim 1,
   wherein the similar communication extraction unit extracts the similar communication from the past data on the basis of characteristics of the malware or characteristics of the communication.

6. The malware analysis continuation system according to claim 5,
   wherein the similar communication extraction unit extracts the similar communication from the past data on the basis of characteristics of a URL path of the communication.

7. The malware analysis continuation system according to claim 5,
   wherein the similar communication extraction unit extracts the similar communication from the past data on the basis of characteristics of parameters of the communication.

8. The malware analysis continuation system according to claim 5,
   wherein the similar communication extraction unit extracts the similar communication from the past data on the basis of characteristics of a sample family of the malware.

9. The malware analysis continuation system according to claim 1, further comprising:
   a user terminal connected via a predetermined network,
   wherein the screen depiction unit displays information related to the malware on a screen of the user terminal.

10. The malware analysis continuation system according to claim 1, further comprising:
   an external user terminal connected to the Internet,
   wherein the screen depiction unit displays information related to the malware on a screen of the external user terminal.

11. A malware analysis continuation method in a malware analysis continuation system connected to an Internet, the malware analysis continuation method comprising:

a communication destination observation step of observing communication with an attacker server and accumulating a response to the communication as past data, using a communication destination observation unit;

a dynamic analysis step of performing dynamic analysis of malware using a dynamic analysis unit;

a communication mediation step of mediating communication of the dynamically analyzed malware and performing control such that the response accumulated as the past data is returned to continue the dynamic analysis even in a case where the communication with the attacker server is stopped, using a communication mediation unit;

a similar communication extraction step of extracting past communication similar to communication generated by the malware as similar communication from the past data, using a similar communication extraction unit; and a screen depiction step of depicting information related to the malware on a screen using a screen depiction unit, wherein a communication summary of the communication and content of the similar communication are displayed as the information related to the malware on the screen, and the communication summary and the similar communication include a URL of the attacker server, a sample family name of the malware, a request issued by the malware, and a response from the attacker server.

12. The malware analysis continuation method according to claim 11, wherein, in the similar communication extraction step, the similar communication is extracted from the past data on the basis of characteristics of the malware or characteristics of the communication.

* * * * *